United States Patent [19]
Rudi

[11] Patent Number: 5,963,395
[45] Date of Patent: Oct. 5, 1999

[54] MULTI-TAPE CARTRIDGE AND MULTI-HEAD DRIVE FOR CONCURRENT DATA TRANSFER TO/FROM MULTIPLE TAPES

[75] Inventor: Guttorm Rudi, Fjellhamar, Norway

[73] Assignee: Tandberg Data ASA, Oslo, Norway

[21] Appl. No.: 09/080,352

[22] Filed: May 18, 1998

[51] Int. Cl.$^6$ .............................. G11B 23/02; G11B 5/008
[52] U.S. Cl. .......................................... 360/96.1; 360/132
[58] Field of Search .................................... 360/132, 96.1, 360/96.5

[56] References Cited

U.S. PATENT DOCUMENTS

| | | | |
|---|---|---|---|
| 4,000,519 | 12/1976 | Turk | 360/132 |
| 4,170,407 | 10/1979 | Stella | 352/72 |
| 4,199,794 | 4/1980 | Pfost et al. | 360/92 |

FOREIGN PATENT DOCUMENTS

1-066884  3/1989  Japan .
1-066885  3/1989  Japan .

*Primary Examiner*—William J Klimowicz
*Attorney, Agent, or Firm*—Hill & Simpson

[57] ABSTRACT

A multi-tape cartridge has a housing containing a central hub on which a number of magnetic tapes are wound in overlapping fashion, and a like number of peripheral hubs in the housing to which the tapes are respectively connected. The tapes proceed from the central hub to the respective peripheral hubs along respective tape paths, and the housing has a number of openings therein which respectively provide access to the tape paths from an exterior of the housing. A multi-head tape drive for use with the cartridge has a central drive motor and peripheral drive motors which are respectively engageable with the central hub and the peripheral hubs of the cartridge. A base plate is rotatable around the drive shaft of the central drive motor, and carries a number of data transfer heads, equal in number to the number of tapes in the cartridge, the data transfer heads projecting through the openings in the cartridge so as to be brought into data transfer contact with the respective tapes in the cartridge when the base plate is rotated.

18 Claims, 5 Drawing Sheets

MULTI-TAPE CARTRIDGE AND MULTI-HEAD DRIVE FOR CONCURRENT DATA TRANSFER TO/FROM MULTIPLE TAPES

BACKGROUND OF THE INVENTION

1. Field of the Invention

The present invention is directed to a tape cartridge and a tape drive, such as a magnetic tape cartridge and a drive of the type known as a tape "streamer," and in particular to a tape cartridge containing multiple tapes and a drive having multiple data transfer heads respectively engageable with multiple tapes.

2. Description of the Prior Art and Related Applications

The need for storing all types of digital information is increasing rapidly. Magnetic tape is by far the least expensive high-capacity medium available today for digital information storage. The suppliers of tape drive and tape medium are always striving to develop new drives with increased storage capacity, shorter access time and higher data rates.

A primary advantage of tape, in addition to its low cost, as an information storage medium is its relatively large recording surface area.

A significant disadvantage of tape as an information storage medium is that tape is a sequential medium. This means that when a data transfer head, such as a read/write head being operated as a read head, is located at a beginning of a tape, it is necessary for the tape to pass along virtually its entire tape length in order to retrieve information at the end of the tape. The access time associated with tape is therefore much longer than the access time associated with hard disks, optical disks and flexible (floppy) disks.

Access time associated with a tape can, at least in theory, be improved by making the tape wider and shorter, so that it takes less time to transport the tape to reach the end of the tape in order to retrieve information located at the end of the tape. There are, however, practical limits to making a tape wider and shorter.

One problem is that the dimensions of the tape, and consequently the dimensions of the cartridge containing the tape, have an influence on the form factor of the drive. A wider tape requires an increased form factor. Consistent with current marketplace desires, the current trend in the industry, however, is to reduce the form factor. Moreover, in library systems the cartridges are stored in magazines, usually with ten cartridges per magazine. Such magazine storage would have to be reconfigured if wider tape, and thus wider cartridges, were employed.

Another problem is that increasing the tape width also increases the air cushion which is unavoidably created between the exterior surface of the tape on the take-up reel and the incoming tape which is being wound onto the take-up reel. In the confined V-shaped space at this location, air which is carried along the surfaces of the rapidly-moving tape becomes entrapped and forms a cushion which pushes the incoming tape slightly away from the wound tape. Increasing the width of the tape would make this trapped volume larger, and thereby increase the cushion effect. This may result in the tape not being firmly wound onto the take-up reel, which can subsequently result in a tape pack shift if the cartridge is subsequently subjected to shock and vibration. As is known to those of skill in this art, a tape pack shift can result in the occurrence of mis-tracking when the tape is subsequently unwound and read.

Another theoretical way to increase the data transfer rate is to use an increased number of write/read heads in parallel. It is well-known, however, that the manufacturing yield of conventional heads decreases, often dramatically, as the number of channels accommodated within the head increases. Employing a wider tape would require the use of an increased number of heads operating in parallel to adequately cover the increased tape width.

Another problem associated with increasing the tape width is that the head-to-tape contact pressure is very difficult to maintain uniformly from the lower tape edge to the upper tape edge. This is due to head tilt (zenith) tolerances and tape transverse cupping and tension.

The above problems are addressed in two co-pending applications which are assigned to the same assignee, Tandberg Data ASA, as the present application. A multiple tape cartridge and drive system is described in co-pending application U.S. Ser. No. 09/006,459, filed Jan. 13, 1998 ("Multiple Tape Cartridge and Drive System Wherein Tapes are Extracted from the Cartridge," Rudi), in which a mechanism is provided to withdraw the multiple tapes from the cartridge to an exterior hub. The multiple tapes are temporarily affixed to the hub and the hub is rotated to unwind the multiple tapes from the hubs in the cartridge housing. Space is provided for a number of data transfer (read/write) heads to be moved adjacent to the respective tapes in a region between the cartridge and the exterior hub, so that data transfer can take place. When a data transfer operation is completed, the tapes are detached from the exterior hub and are returned to the inside of the cartridge.

In another co-pending application, U.S. Ser. No. 09/041,689 filed Mar. 13, 1998 (Multiple Tape Cartridge and Drive for Concurrent Recording with the Tapes Disposed in the Cartridge," Rudi) the cartridge housing is provided with an access opening into which multiple data transfer heads can be simultaneously inserted. When inside the housing, each data transfer head is adjacent the tape transport path traversed by one tape, among multiple tapes, which are wound in overlapping fashion on two reels in the housing. The tapes thus always remain in the housing, even during data transfer.

Many types of robotics systems are available for cartridge handling and manipulation, such as so-called loader and library systems. For these types of systems, currently two cartridge form factors are particularly important, these being the DLT cartridge, commercially available from Quantum, and the IBM 3840/3490 cartridge. Both of these cartridges employ tape which is one-half inch in width. A large number of loader/library systems currently in use are designed to handle cartridges having a form factor corresponding to these standardized cartridges.

An advantage of these cartridge types is that they have a large available recordable surface area which is available, compared to other cartridge types and other media types. A disadvantage of these types of cartridge, however, is that the data transfer rate is limited because the number of data transfer (read/write) heads is limited which can be used in parallel for a one-half inch tape. Another disadvantage of these standardized cartridge types is that in order to obtain access to data at the end of the tape, it is necessary to unwind (or rewind) the entire tape length, which is approximately 2,000 feet. An unavoidable delay is therefore associated with obtaining access to data at this location on the tape.

Moreover, these standardized cartridges are of a type wherein the tape is extracted from the cartridge, and is wound onto a take-up hub located remote from the cartridge in the drive, and thus before the cartridge can be unloaded (removed from the drive), the tape must be completely rewound and returned to the cartridge. Moreover, the tape threading mechanism associated with cartridges of this type is very complex, and this complex threading mechanism imposes a lower limit for tape thickness, and thus also imposes a lower limit for tape length.

SUMMARY OF THE INVENTION

It is an object of the present invention to provide a multi-tape cartridge having a housing form factor which is identical to the standardized form factor used in conventional loader/library systems wherein there is no need to extract the tapes from the interior of the cartridge in order to effect data transfer, with the multiple tapes being arranged within the cartridge housing to afford sufficient room for inserting a data transfer head into the cartridge housing.

It is a further object of the present invention to provide a multi-head tape drive for use with a multi-tape cartridge constructed in accordance with the invention.

It is a further object to provide a combination of a multi-tape cartridge and a multi-head tape drive in a multi-tape data transfer system.

The above objects are achieved in a multi-tape cartridge having a housing with a central hub mounted in a central region of the housing with a number of magnetic tapes wound in overlapping fashion on the central hub, a number of peripheral hubs equal in number to the number of magnetic tapes, with the peripheral hubs being mounted in a peripheral region of the housing and being respectively connected to free ends of the magnetic tapes wound on the central hub, and a number of openings in the housing equal in number to the number of magnetic tapes, the openings being respectively disposed at locations for exposing the tapes as they traverse respective tape paths between the central hub and the peripheral hubs.

The openings afford access to each of the tape paths by respective data transfer heads of a drive, and thus the tapes are not extracted from the interior of the cartridge in order to effect data transfer. The complicated threading mechanisms which characterize known multi-tape cartridge and drive systems are thus avoided. Since these threading mechanism, as noted above, impose limitations on the thickness, and correspondingly on the length, of the tape which can be used, the avoidance of the use of such a threading mechanism allows thinner and longer tapes to be used.

In an embodiment of the multi-tape cartridge, for tapes are wound in overlapping fashion on the central hub, and are respectively connected to four peripheral hubs respectively disposed in corner regions of the housing. In this embodiment, if one-half inch tape is used, the performance is the same as if a two inch tape had been used in a conventional system.

Each of the central hub and the peripheral hubs has a splined recess therein adapted to receive a drive shaft of a respective drive motor. Because individual motors are used for all of the hubs, individual tape tension control for each tape can be effected.

Only the central hub needs to be provided with flanges for retaining the wound tape therebetween. These flanges provide sufficient guidance for the tape packet formed by the four overlapping tapes as they are wound and unwound from the central hub, and therefore the peripheral hubs need not be provided with flanges, thereby allowing a compact structure within the housing to be achieved.

A tape guide can be provided between the central hub and each of the peripheral hubs, to respectively define the tape paths between the central hub and the peripheral hubs. The tape guides can be disposed relatively close to the respective sidewalls of the housing, thereby producing more room for accommodating the respective data transfer heads.

A multi-head tape drive for use with a multi-tape cartridge of the type described above has a base plate with a central region and a peripheral region surrounding the central region, with alternating peripheral projections and peripheral gaps. A central drive motor has a rotatable drive shaft which extends through the base plate in the central region, the central drive motor having a rotatable drive shaft projecting therefrom, and adapted to engage and rotate a tape hub, namely the central hub of the aforementioned multi-tape cartridge constructed in accordance with the invention. The base plate is rotatable around the axis of the central hub drive shaft. The multi-head tape drive also includes a number of peripheral drive motors respectively disposed in the peripheral gaps of the base plate, the peripheral drive motors having a rotatable drive shaft projecting therefrom substantially parallel to the drive shaft of the central drive motor. Each drive shaft of each peripheral drive motor is adapted to receive a respective tape hub, namely the peripheral tape hubs of the multi-tape cartridge in accordance with the invention. A number of data transfer heads, equal to the number of peripheral drive motors, are also mounted on the base plate, at locations alternating with the locations of the peripheral drive motors. Each of the data transfer heads projects from the base plate substantially parallel to drive shaft of the central drive motor. Each data transfer head has a pair of tape guides adjacent thereto, mounted on the base plate projection on which the adjacent head is mounted. The two tape guides in each pair straddle the data transfer head adjacent thereto, i.e., one guide in the pair is disposed on each side of the data transfer head.

Either the base plate can be moved toward a multi-tape cartridge, held at a predetermined position, or a multi-tape cartridge can be manipulated so as to be placed over the base plate, with all of the drive shafts of the central drive motor and the peripheral drive motors respectively engaging the central hub and the peripheral hubs of the multi-tape cartridge. During this loading operation, the data transfer heads and the pairs of tape guides respectively straddling the data transfer heads are also inserted into the multi-tape cartridge, via the aforementioned openings therein. When inside the tape cartridge, the data transfer heads are positioned a short distance from the respective tapes proceeding along their respective tape paths from the central hub to the peripheral hubs. The base plate is then rotated slightly to bring each of the data transfer heads into data transfer engagement with the respective tapes.

During an unload procedure, the base plate is rotated in the opposite direction to disengage the data transfer heads from the respective tapes, and the drive shafts of the central drive motor and the peripheral drive motors are removed from the central hub and the peripheral hubs, respectively.

DESCRIPTION OF THE PREFERRED EMBODIMENTS

Figures 1, 2:
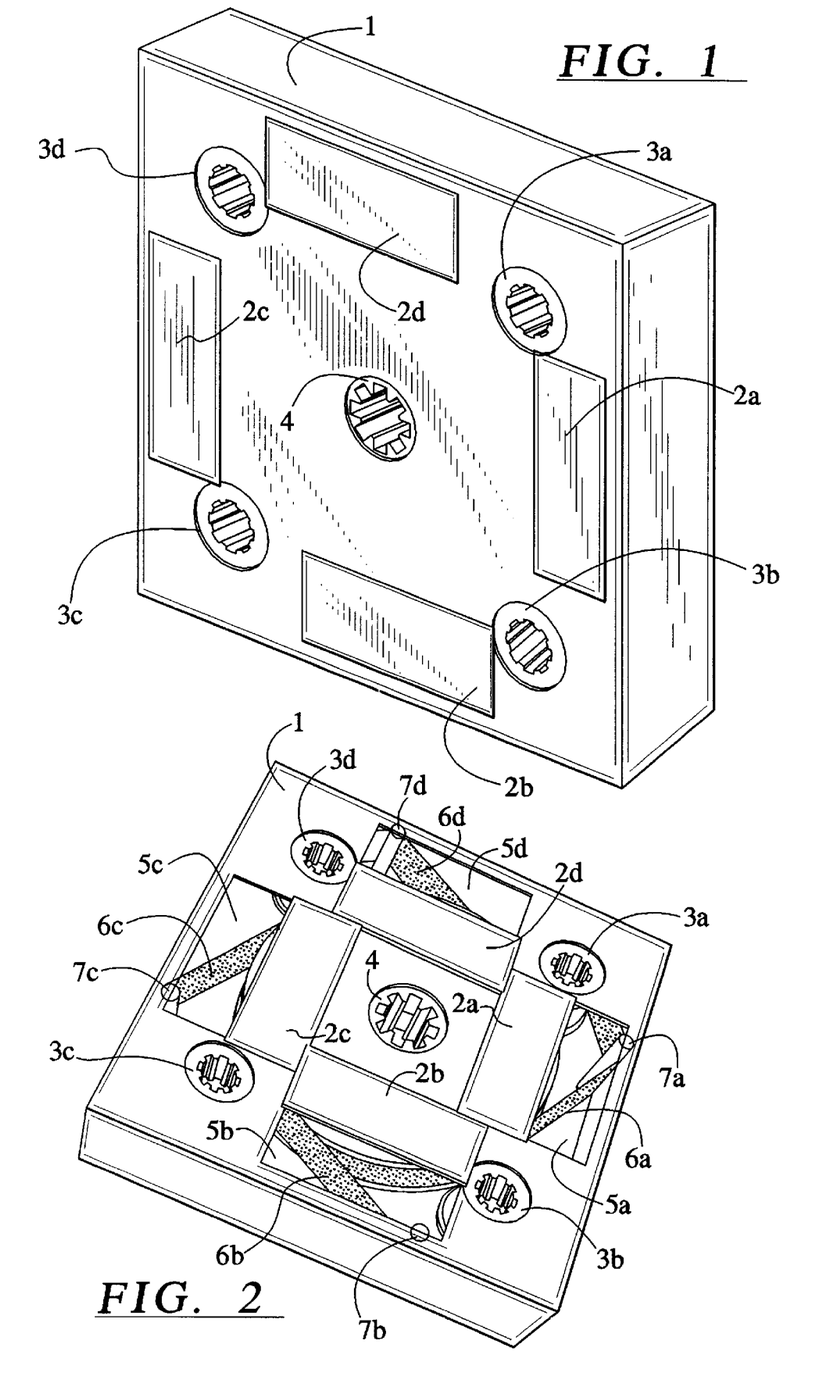
FIG. 1 is a perspective view showing the bottom of a multi-tape cartridge, constructed in accordance with the principles of the present invention with the access openings closed.
FIG. 2 is another perspective view of the bottom of the multi-tape cartridge of FIG. 1, with the access openings opened.
Figure 3:
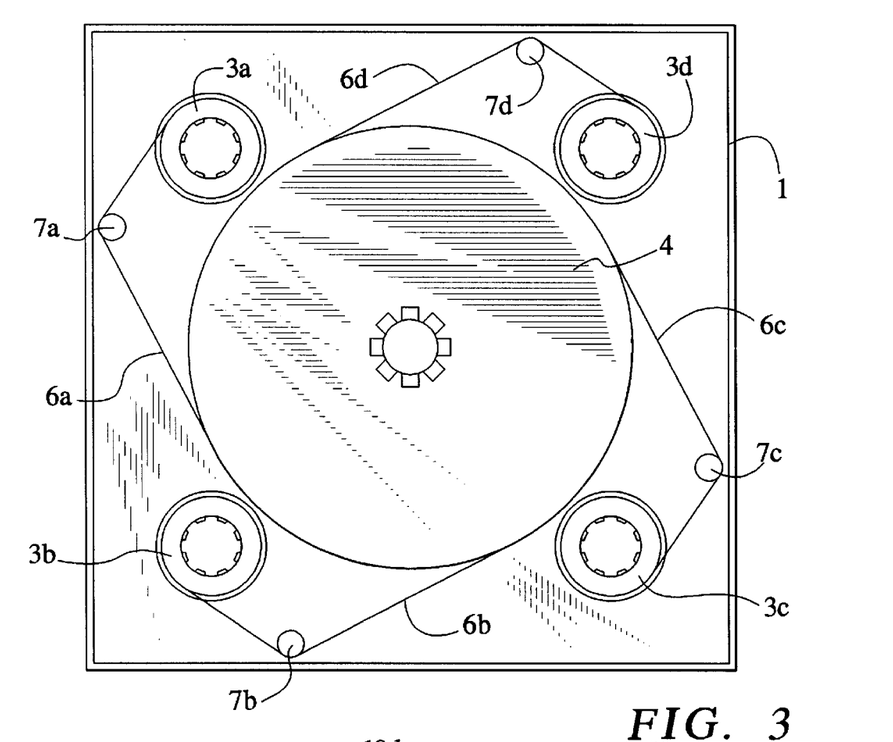
FIG. 3 is a view of the multi-tape cartridge of FIG. 1 from above, with the cartridge top removed.

A multi-tape cartridge constructed in accordance with the invention is shown in various views in FIGS. 1, 2 and 3. The cartridge includes a housing 1, having a top and bottom connected by four sidewalls to form an enclosed container. In the view shown in FIG. 3, the top has been removed in order to show the interior components.

In the embodiment shown in FIGS. 1, 2 and 3, the housing 1 has four openings 5a, 5b, 5c and 5d in the bottom thereof, which are respectively closed by slidable covers 2a, 2b, 2c and 2d. The covers are shown in FIG. 1 closing the respective openings, and are shown in FIG. 2 in a position wherein the covers 2a, 2b, 2c and 2d have been respectively moved so as to expose the openings 5a, 5b, 5c and 5d. Any suitable mechanism known to those skilled in the art of tape drives can be used to effect movement of the sliding covers 2a, 2b, 2c and 2d.

The bottom of the housing 1 also has five circular openings therein, including a central circular opening which is in registration with a splined drive receptacle of a central tape hub 4. The central tape hub 4 is rotationally mounted in the housing 1 in a central region thereof. In the embodiment of FIGS. 1, 2 and 3, four peripheral tape hubs 3a, 3b, 3c and 3d are distributed at a peripheral region of the housing 1 surrounding the central region, in this case generally at the respective corners of the housing 1.

As can be seen in FIG. 3, four magnetic tapes 6a, 6b, 6c and 6d are wound in overlapping fashion to form a tape packet on the central tape hub 4. Each magnetic tape 6a, 6b, 6c and 6d has a free end, these free ends being respectively connected to the peripheral tape hubs 3a, 3b, 3c and 3d. As explained below, when the multi-tape cartridge shown in FIGS. 1, 2 and 3 is engaged with a correspondingly constructed multi-head tape drive, there must be room within the housing 1 to accommodate insertion of data transfer heads of the multi-head tape drive. Depending on the configuration of the central hub 4 and the peripheral hubs 3a, 3b, 3c and 3d within the housing 1 of the multi-tape cartridge, it may be necessary to provide respective tape guides 7a, 7b, 7c and 7d for the tapes 6a, 6b, 6c and 6d. The tape guides 7a, 7b, 7c and 7d can project either from the top or the bottom of the housing 1, or can extend completely between the top and bottom of the housing 1.

As can be seen in FIG. 2, when the covers 2a, 2b, 2c and 2d are respectively slid to their open positions, the respective transport paths of tapes 6a, 6b, 6c and 6d are accessible from the exterior of the housing 1.

Figure 4:
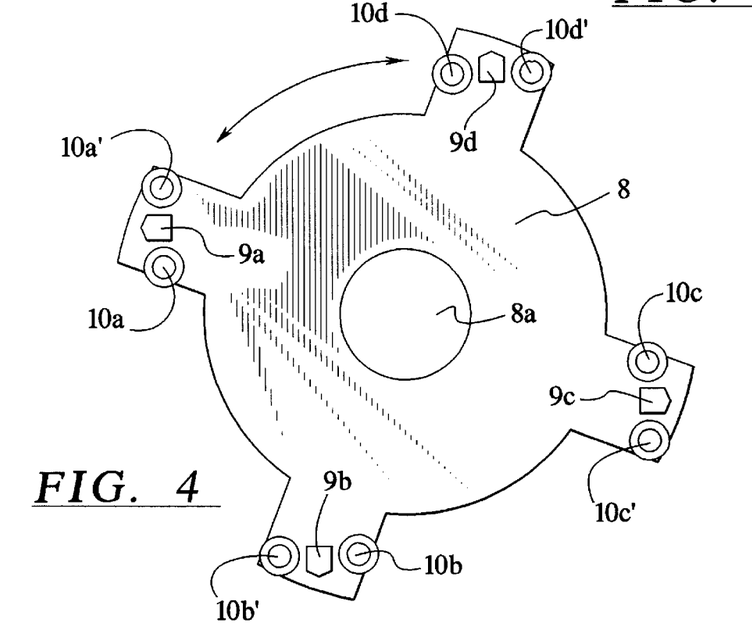
FIG. 4 is a plan view of the base plate used in the multi-head tape drive, constructed in accordance with the principles of the present invention.

As shown in FIG. 4, a multi-head tape drive constructed in accordance with the principles of the present invention has a base plate 8, with a central opening 8a therein, in a central region of the base plate 8. The base plate 8 has a number of projections extending from a periphery thereof, separated by peripheral gaps. Data transfer heads 9a, 9b, 9c and 9d are respectively mounted on the peripheral projections of the base plate 8. The data transfer heads 9a, 9b, 9c and 9d are preferably each capable of writing data onto and reading data from the respective magnetic tapes 6a, 6b, 6c and 6d in a known manner. At each peripheral projection of the base plate 8, the data transfer heads 9a, 9b, 9c and 9d are respectively straddled by a pair of tape guides. Tape guides 10a, and 10a' straddle the data transfer head 9a, tape guides 10b and 10b' straddle the data transfer heads 9b, tape guides 10c and 10c' straddle the data transfer head 9c, and tape guides 10d and 10d' straddle the data transfer head 9d. As indicated by the double curved arrow in FIG. 4, the base plate 8 is rotatable around a central axis proceeding through the center of the opening 8a.

Figure 5:
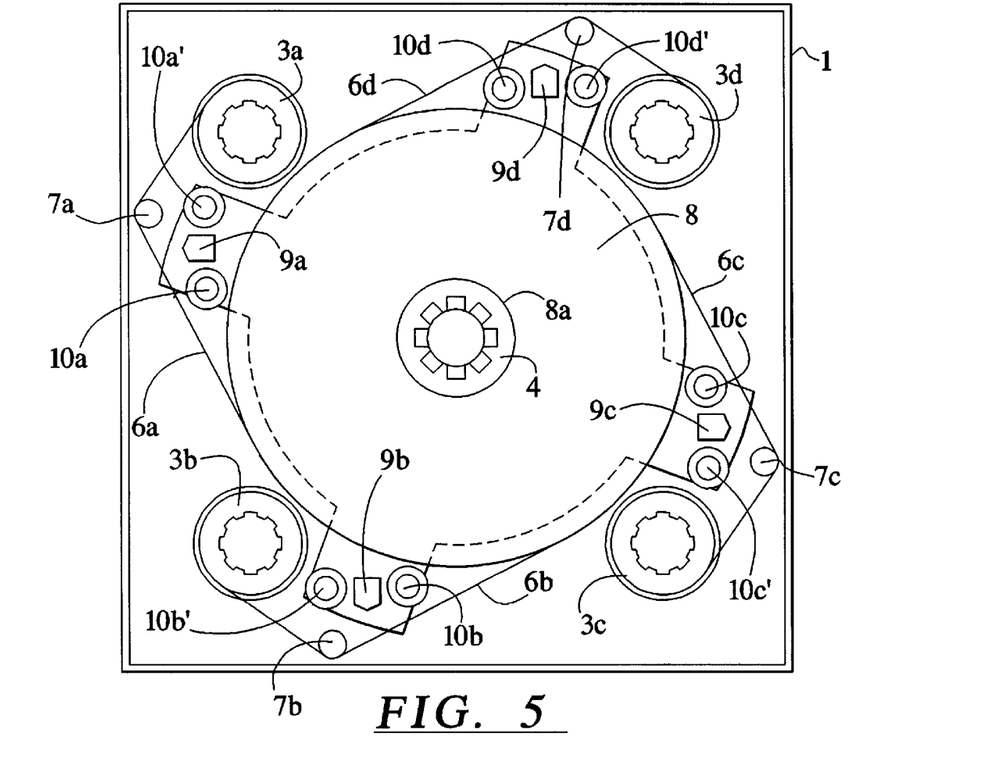
FIG. 5 is a view of a multi-tape cartridge from above, with the top removed, engaged with a multi-head tape drive, in accordance with the invention.

FIG. 5 shows the data transfer heads 9a, 9b, 9c and 9d on the base plate 8 engaged into the multi-tape cartridge housing 1. In the view shown in FIG. 5, the top has been removed from the housing 1 to show the interior components. The bottom of the housing 1 in FIG. 5 will be as shown in FIG. 2, however, for clarity the openings and covers have not been separately shown in FIG. 5.

As can be seen in FIG. 5, in the loaded condition, the data transfer heads 9a, 9b, 9c and 9d, and their associated tape guides, come to be located in an open space between each peripheral hub and the tape respectively connected thereto. The system is shown in FIG. 5 in a state just after loading, (or just before unloading) wherein a spacing still exists between the data transfer heads 9a, 9b, 9c and 9d and the respective magnetic tapes 6a, 6b, 6c and 6d. After loading, when the base plate 8 is subsequently rotated (counterclockwise, in the orientation shown in FIG. 5), the respective data transfer heads 9a, 9b, 9c and 9d will be moved into data transfer engagement with the respective magnetic tapes 6a, 6b, 6c and 6d. When the data transfer heads and the magnetic tapes are so engaged, data transfer (i.e., reading, writing, or reading and writing) can take place. After data transfer has been completed, the base plate 8 is rotated in the opposite direction and is unloaded from the housing 1.

Figure 6:
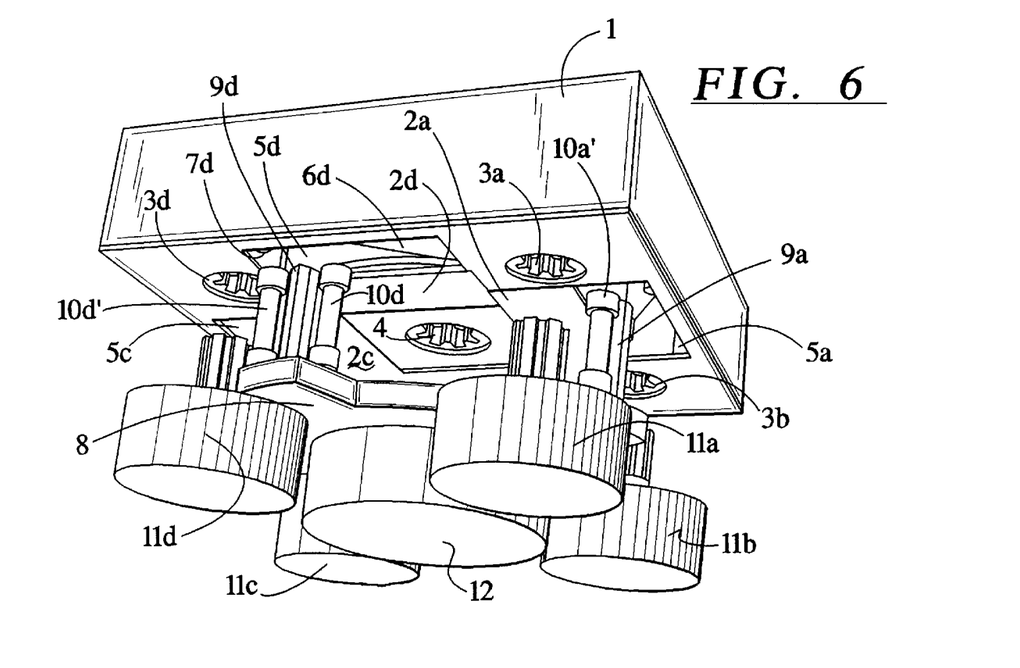
FIG. 6 is a schematic view showing a multi-head tape drive constructed in accordance with the principles of the present invention just before loading into a multi-tape cartridge constructed in accordance with the principles of the present invention.

Further components of the multi-head tape drive constructed in accordance with the invention are shown in FIG. 6. Peripheral drive motors 11a, 11b, 11c and 11d are mounted in a suitable manner within the peripheral gaps of the base plate 8. The peripheral drive motors 11a, 11b, 11c and 11d can be mechanically supported in any known manner, and the details of the supporting structure are not important to the invention, and therefore have not been shown in FIG. 6. Each of the peripheral drive motors 11a, 11*b*, 11*c* and 11*d* has a drive shaft projecting therefrom, these drive shafts being splined in a complementary manner relative to the drive receptacles of the peripheral tape hubs 3*a*, 3*b*, 3*c* and 3*d*, and being respectively in registration therewith.

The multi-head tape drive also includes a central drive motor 12, having a drive shaft which projects through the central opening 8*a* in the base plate 8. The drive shaft of the drive motor 12 engages the splined recess in the central tape hub 4. The central drive motor 12 can be, if desired, attached to the base plate 8 in a manner allowing rotation of the base plate 8 around the axis of rotation of the drive shaft of the central drive motor 12. During a load operation, relative motion is produced between the cartridge 1 and the tape drive so as to engage the respective drive shafts of the central drive motor 12 and the peripheral drive motors 11*a*, 11*b*, 11*c* and 11*d* with the central tape hub 4 and the peripheral tape hubs 3*a*, 3*b*, 3*c* and 3*d*, so that all of the motors are in driving engagement with the respective hubs. The aforementioned relative motion can be produced either by moving the cartridge housing 1 or moving the tape drive, or a combination of both. After such loading, the base plate 8 is rotated as described above to bring the data transfer heads into data transfer contact with the respective magnetic tapes in the housing 1. During data transfer, the drive motors 12 and 11*a*, 11*b*, 11*c* and 11*d* are operated in coordinated fashion so as to cause the magnetic tapes 6*a*, 6*b*, 6*c* and 6*d* to traverse the respective transport paths between the central tape hub 4 and the peripheral tape hubs 3*a*, 3*b*, 3*c* and 3*d*. Winding and unwinding of the magnetic tapes can thus be effected. Because all of the hubs in the housing 1 are individually driven, appropriate tape tension can be individually monitored and controlled for each of the tapes 6*a*, 6*b*, 6*c* and 6*d*. Monitoring and controlling of the individual tape tensions can be accomplished using known techniques for single tapes, including appropriate tension sensors and appropriate control circuitry for adjusting and coordinating the relative rotational speeds of the central drive motor 12 and each of the peripheral drive motors 11*a*, 11*b*, 11*c* and 11*d*. Since such tape tensioning techniques and structure are well-known to those in the field of tape drive technology, the components for accomplishing such individual tensioning need not be further described herein.

Figure 7:
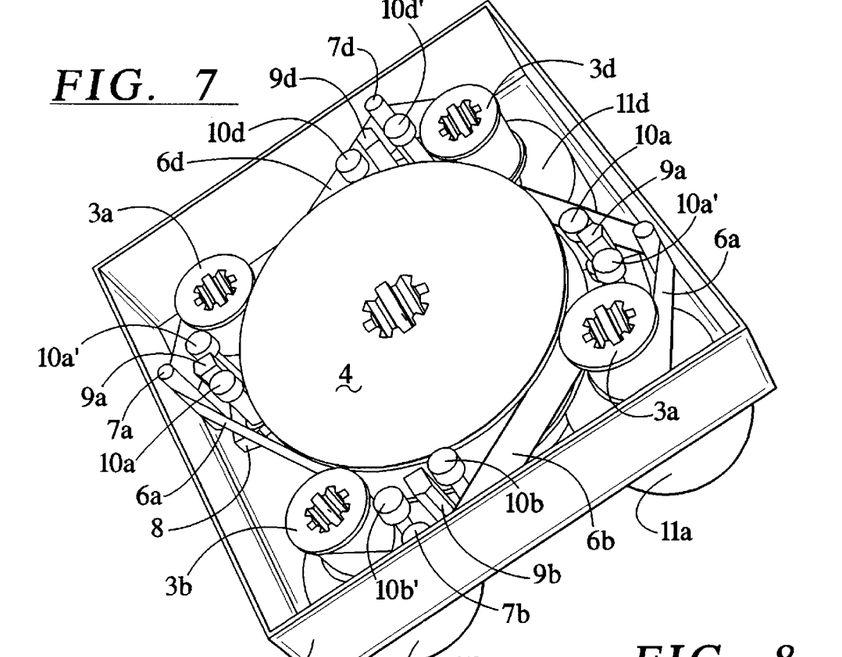
FIG. 7 is a perspective view of a multi-tape cartridge constructed in accordance with the principles of the present invention, with the top removed, engaged with a multi-head tape drive constructed in accordance with the principles of the present invention.

FIG. 7 shows the multi-head tape drive and the multi-tape cartridge in a loaded state, but before rotating the base plate 8, FIG. 7 showing only the sidewalls of the housing 1, for clarity. As can be seen in FIGS. 6 and 7, the respective drive shafts of the peripheral drive motors 11*a*, 11*b*, 11*c* and 11*d* are parallel to the drive shaft of the central drive motor 4, and the respective data transfer heads 9*a*, 9*b*, 9*c* and 9*d* are mounted on the base plate 8 so as also to be parallel to the drive shaft of the central drive motor 12. Preferably the tape guides 7*a*, 7*b*, 7*c* and 7*d*, as well as the tape guide 10*a*, 10' and 10*b*, 10*b*' and 10*c*, 10*c*' and 10*d*, 10*d*' are also parallel to the drive shaft of the central drive motor 12.

Figure 8:
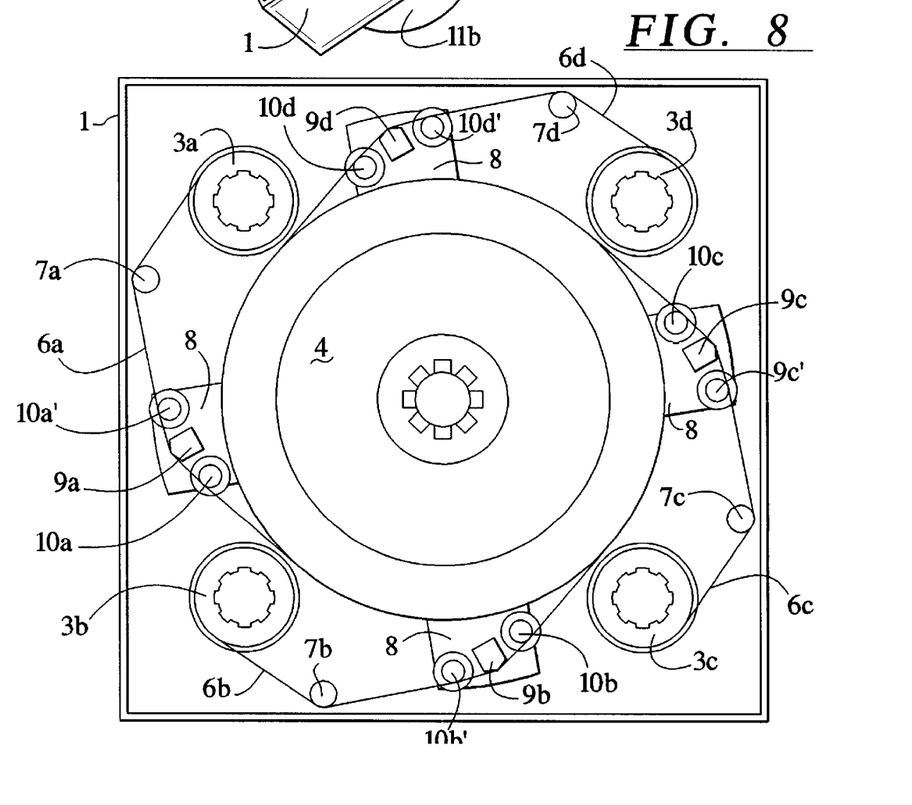
FIG. 8 is a view of a multi-tape cartridge constructed in accordance with the principles of the present invention from above, with the top removed, engaged with a multi-head tape drive constructed in accordance with the principles of the present invention, in a state wherein the tapes are substantially all wound on the central hub.
Figure 9:
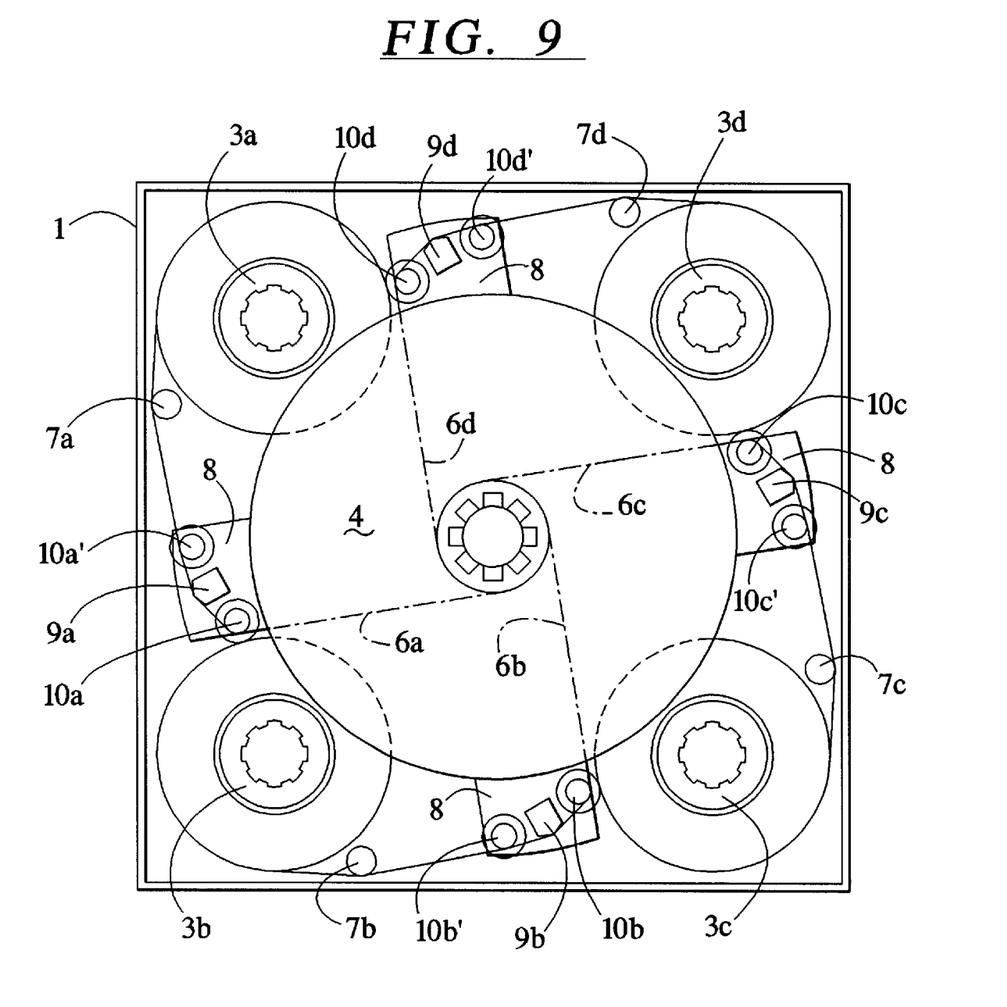
FIG. 9 is a view of a multi-tape cartridge constructed in accordance with the principles of the present invention from above, with the top removed, engaged with a multi-head tape drive constructed in accordance with the principles of the present invention, in a state wherein the respective tapes are substantially completely wound on the peripheral hubs.

FIGS. 8 and 9 are views of the drive system loaded into the cartridge as seen from above, with the top of the housing 1 removed. FIG. 8 shows the configuration of this combination when the tapes 6*a*, 6*b*, 6*c* and 6*d* are substantially completely wound on the central tape hub 4, in overlapping fashion, and with the base plate 8 having been rotated to bring the data transfer heads 9*a*, 9*b*, 9*c* and 9*d* into data transfer contact with the respective tapes 6*a*, 6*b*, 6*c* and 6*d*. FIG. 9 shows the configuration when the tapes 6*a*, 6*b*, 6*c* and 6*d* have been substantially completely unwound from the central hub 4, and are substantially completely wound onto the respective peripheral hubs 3*a*, 3*b*, 3*c* and 3*d*.

As can be seen in FIGS. 8 and 9, only the central hub 4 is provided with flanges, extending substantially perpendicularly to the rotational axis of the central tape hub 4, and between which the tape packet consisting of the four overlapping tapes 6*a*, 6*b*, 6*c* and 6*d* is held. The peripheral hubs 3*a*, 3*b*, 3*c* and 3*d* are not provided with flanges, or have only very small flanges. As can be seen in FIG. 9, the configuration of the hubs within the housing 1 is such that the flanges of the central tape hub 4 also serve to maintain the respective tape packets on the peripheral hubs 3*a*, 3*b*, 3*c* and 3*d* in a neatly wound form, since the flanges of the central tape hub 4 overlap the tape packets as they grow on the respective peripheral tape hubs 3*a*, 3*b*, 3*c* and 3*d*.

The invention has been described herein with reference to an embodiment employing four magnetic tapes and four peripheral tape hubs and four peripheral drive motors. This results in a housing 1 which has dimensions conforming to the aforementioned standardized format used in conventional load/library robotic systems. Other configurations are possible, however, which may still satisfy this format, and many other configurations are possible for applications which do not have to conform to that standard. More or fewer tapes can be employed, with the only criterion being that the respective numbers of tapes, peripheral hubs, data transfer heads, and access openings in the cartridge housing must all agree.

Moreover, it will be understood that the references herein to "top" and "bottom" are relative and do not necessarily define a particular orientation in which the cartridge and/or the drive must always be used.

Although modifications and changes may be suggested by those skilled in the art, it is the intention of the inventor to embody within the patent warranted hereon all changes and modifications as reasonably and properly come within the scope of his contribution to the art.

I claim as my invention:

1. A multi-tape cartridge comprising:
   a housing having a top and a bottom connected by a plurality of sidewalls, and containing a central region surrounded by a peripheral region;
   a central hub rotatably mounted in said central region in said housing;
   a plurality of magnetic tapes wound in overlapping fashion on said central hub, each of said plurality of magnetic tapes having a free end;
   a plurality of peripheral hubs, equal in number to said plurality of magnetic tapes, rotatably mounted in said peripheral region of said housing at respective locations between said central hub and said sidewalls, the free ends of said plurality of magnetic tapes being respectively connected to said peripheral hubs with said magnetic tapes proceeding along respective tape paths from said central hub to the respective peripheral hubs; and
   a plurality of openings in said housing, equal in number to said plurality of magnetic tapes, respectively disposed at locations exposing the respective tape paths to an exterior of said housing.

2. A multi-tape cartridge as claimed in claim 1 wherein said plurality of magnetic tapes comprises four magnetic tapes.

3. A multi-tape cartridge as claimed in claim 2 wherein said housing has four corners, and wherein said peripheral hubs are respectively disposed at said four corners of said housing.

4. A multi-tape cartridge as claimed in claim 1 further comprising a plurality of covers slidably attached to said housing and normally respectively covering said openings in said housing, said covers being respectively temporarily slidable away from the respective openings to respectively expose said respective openings.

5. A multi-tape cartridge as claimed in claim 1 wherein said central hub has an upper flange and a lower flange and wherein said plurality of peripheral hubs respectively have substantially no flanges, said central hub and said plurality of peripheral hubs being disposed in said housing relative to each other so that as said magnetic tapes are respectively wound onto said peripheral hubs in respective growing tape packets, said growing tape packets are disposed between said flanges of said central hub.

6. A multi-tape cartridge as claimed in claim 1 further comprising a plurality of tape guides disposed in said housing adjacent the respective tape paths between said central hub and the respective peripheral hubs.

7. A multi-tape cartridge as claimed in claim 1 wherein said top and said bottom of said housing are square.

8. A multi-head tape drive comprising:
   a base plate having a central region and a peripheral region surrounding said central region, said peripheral region including a plurality of peripheral projections extending from said central region alternating with a plurality of peripheral gaps;
   a central drive motor having a rotatable drive shaft projecting therefrom and extending through said central region of said base plate, said base plate being rotatable around said drive shaft of said central drive motor;
   a plurality of peripheral drive motors respectively mounted in said peripheral gaps of said base plate, each of said peripheral drive motors having a rotatable drive shaft projecting therefrom substantially parallel to said drive shaft of said central drive motor;
   a plurality of data transfer heads mounted on said base plate respectively at said peripheral projections, each of said data transfer heads projecting from said base plate substantially parallel to said drive shaft of said central drive motor; and
   a plurality of pairs of tape guides respectively mounted adjacent said data transfer heads at the respective peripheral projections of said base plate, each pair of tape guides straddling the data transfer head adjacent thereto.

9. A multi-head tape drive as claimed in claim 8 wherein said plurality of peripheral drive motors comprises four peripheral drive motors and wherein said plurality of data transfer heads comprises four data transfer heads.

10. A multi-head tape drive as claimed in claim 8 wherein said plurality of peripheral drive motors are respectively disposed at corners of a square surrounding said central drive motor.

11. A multi-head tape cartridge and drive system comprising:
   a housing having a top and a bottom connected by a plurality of sidewalls, and containing a central region surrounded by a peripheral region;
   a central hub rotatably mounted in said central region in said housing;
   a plurality of magnetic tapes wound in overlapping fashion on said central hub, each of said plurality of magnetic tapes having a free end;
   a plurality of peripheral hubs, equal in number to said plurality of magnetic tapes, rotatably mounted in said peripheral region of said housing at respective locations between said central hub and said sidewalls, the free ends of said plurality of magnetic tapes being respectively connected to said peripheral hubs with said magnetic tapes proceeding along respective tape paths from said central hub to the respective peripheral hubs;
   a plurality of openings in said housing, equal in number to said plurality of magnetic tapes, respectively disposed at locations exposing the respective tape paths to an exterior of said housing;
   a base plate having a central region and a peripheral region surrounding said central region, said peripheral region including a plurality of peripheral projections extending from said central region alternating with a plurality of peripheral gaps;
   a central drive motor having a rotatable drive shaft projecting therefrom and extending through said central region of said base plate, said base plate being rotatable around said drive shaft of said central drive motor;
   a plurality of peripheral drive motors respectively mounted in said peripheral gaps of said base plate, each of said peripheral drive motors having a rotatable drive shaft projecting therefrom substantially parallel to said drive shaft of said central drive motor;
   a plurality of data transfer heads mounted on said base plate respectively at said peripheral projections, each of said data transfer heads projecting from said base plate substantially parallel to said drive shaft of said central drive motor;
   a plurality of pairs of tape guides respectively mounted adjacent said data transfer heads at the respective peripheral projections of said base plate, each pair of tape guides straddling the data transfer head adjacent thereto; and
   said drive shaft of said central drive motor being engageable with said central hub and the respective drive shafts of said peripheral drive motors being respectively engageable with said peripheral hubs and said plurality of data transfer heads and said plurality of tape guides extending respectively into said openings when said central drive motor and said central hub, and said peripheral drive motors and said peripheral hubs, are engaged, with said data transfer heads respectively adjacent the respective tape paths of said plurality of magnetic tapes.

12. A multi-tape cartridge and drive system as claimed in claim 11 wherein said plurality of magnetic tapes comprises four magnetic tapes.

13. A multi-tape cartridge and drive system as claimed in claim 12 wherein said housing has four corners, and wherein said peripheral hubs are respectively disposed at said four corners of said housing.

14. A multi-tape cartridge and drive system as claimed in claim 1 1 further comprising a plurality of covers slidably attached to said housing and normally respectively covering said openings in said housing, said covers being respectively temporarily slidable away from the respective openings to respectively expose said respective openings.

15. A multi-tape cartridge and drive system as claimed in claim 11 wherein said central hub has an upper flange and a lower flange and wherein said plurality of peripheral hubs respectively have substantially no flanges, said central hub and said plurality of peripheral hubs being disposed in said housing relative to each other so that as said magnetic tapes are respectively wound onto said peripheral hubs in respective growing tape packets, said growing tape packets are disposed between said flanges of said central hub.

16. A multi-tape cartridge and drive system as claimed in claim 11 further comprising a plurality of tape guides disposed in said housing adjacent the respective tape paths between said central hub and the respective peripheral hubs.

17. A multi-tape cartridge and drive system as claimed in claim 11 wherein said plurality of peripheral drive motors comprises four peripheral drive motors and wherein said plurality of data transfer heads comprises four data transfer heads.

18. A multi-tape cartridge and drive system as claimed in claim 11 wherein said plurality of peripheral drive motors are respectively disposed at corners of a square surrounding said central drive motor.

* * * * *